Sept. 29, 1970   G. M. DONAHUE   3,531,298
PROTECTIVE COVER MEANS AND BLANKS FOR MAKING SUCH COVER MEANS
Filed June 2, 1967   5 Sheets-Sheet 1

INVENTOR.
GARY M. DONAHUE
BY
Glenn, Palmer & Lyne
HIS ATTORNEYS

Sept. 29, 1970 G. M. DONAHUE 3,531,298
PROTECTIVE COVER MEANS AND BLANKS FOR MAKING SUCH COVER MEANS
Filed June 2, 1967 5 Sheets-Sheet 5

INVENTOR
GARY M. DONAHUE

BY
Glenn, Palmer & Lyne
HIS ATTORNEYS

United States Patent Office 3,531,298
Patented Sept. 29, 1970

3,531,298
PROTECTIVE COVER MEANS AND BLANKS FOR MAKING SUCH COVER MEANS
Gary M. Donahue, Chesterfield County, Va., assignor to Reynolds Metals Company, Richmond, Va., a corporation of Delaware
Filed June 2, 1967, Ser. No. 643,209
Int. Cl. B65b 25/22
U.S. Cl. 99—171                              19 Claims

ABSTRACT OF THE DISCLOSURE

This disclosure relates to a protective cover means which has central surface means which may be expanded outwardly to define a resilient structure used to hold a product such as a frozen pastry product and its dish-like container in an enclosing carton during transportation and handling thereof; also, such central surface means may be adjustably expanded outwardly to define opening means in such protective cover means which allows heated air to surround the pastry product during heating thereof in an oven. This disclosure also relates to a method of baking using such protective cover means.

BACKGROUND OF THE INVENTION

Many food products such as pies, for example, are sold in a frozen unbaked condition. During the transportation and handling of such frozen pies each pie is often caused to strike inside surface means of its associated carton thereby causing damage to the pie such as breaking of the crust, etc. In addition, during the process of heating a food product in an oven, there is the possibility of charring the top portion of such food product before it is thoroughly heated and/or cooked. Especially during the process of baking a pie, whether it be a previously frozen pie or of an unfrozen variety, there is considerable chance of burning the pie crust particularly about its peripheral edges unless extra care is used. However, in many instances a particular pie may have a burnt or charred crust while its inner portion may not have been subjected to the heated environment for a sufficient amount of time to assure proper baking.

SUMMARY

This invention provides improved dual purpose protective cover means which is fastened in position over a dish-like container such as a pie pan containing a pie, for example, to protect the pie from damage while it is in its enclosing carton during transportation and handling thereof; furthermore, the protective cover means of this invention protects the pie during baking to prevent the crust from charring while providing expandable opening means allowing heated air to reach the top surface of the pie for proper baking.

Other details, uses, and advantages of this invention will become apparent as the following description of the embodiments thereof presented in the accompanying drawing proceeds.

BRIEF DESCRIPTION OF THE DRAWING

The accompanying drawing shows present preferred embodiments of this invention, in which.

DESCRIPTION OF ILLUSTRATED EMBODIMENTS

In the exemplary embodiment of this invention illustrated in FIGS. 1–5 of the drawings, an improved protective cover means designated generally by the numeral 20 is shown fastened in position over a dish-like container such as a pie pan 21 containing a pie 22 having a top peripheral crust portion designated by the numeral 23. The exemplary protective cover means or cover 20 of this invention serves the dual purpose of protecting the pie 22 while it and its pie pan 21 are in an enclosing carton during transportation and handling thereof as well as protecting the pie 22 during the time that such pie is placed in a heating oven for baking thereof.

Figure 1:
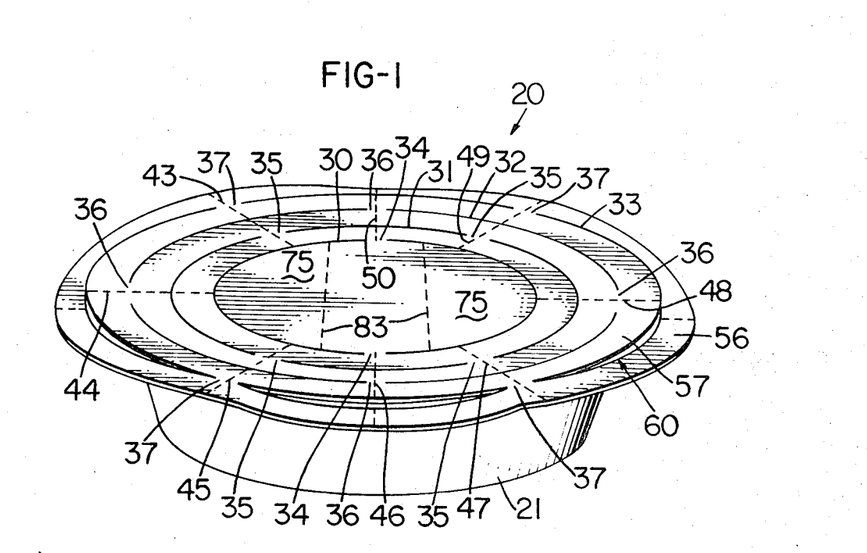
FIG. 1 is a perspective view illustrating the protective cover means of this invention fastened in position over a dish-like container or pie pan containing a pie.
Figure 2:
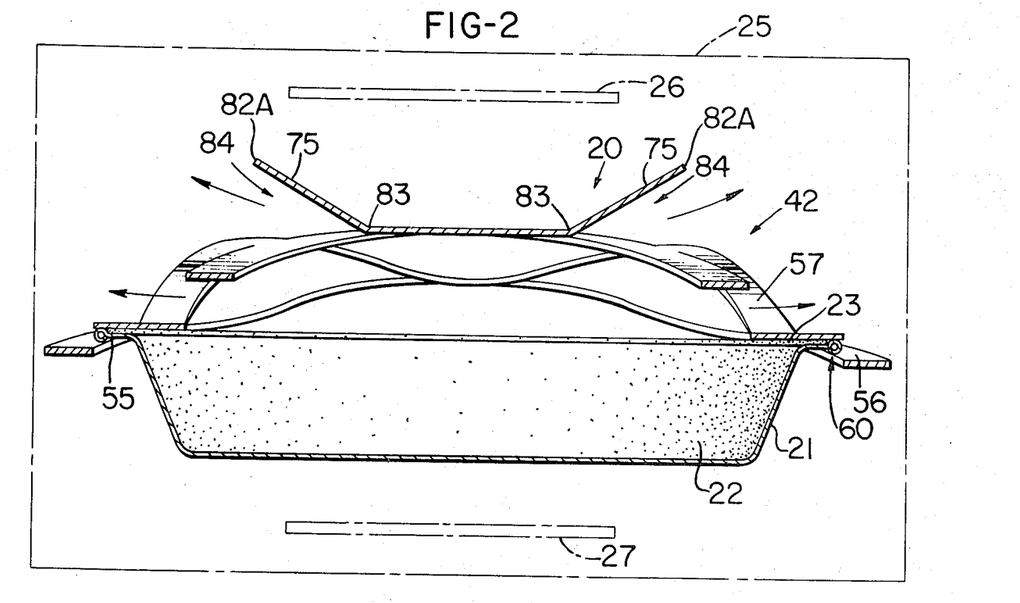
FIG. 2 is a view showing the pie in elevation and the pie pan and portions of the protective cover means (in an expanded condition) in section, all being suitably supported in an oven.

As seen particularly in FIG. 2 of the drawings, the protective cover 20 comprises expandable opening means which allow it to be expanded from the position illustrated in FIG. 1 to the position illustrated in FIG. 2 to provide a maximum desired area opening which allows heated air to contact the top surface of the pie 22 during baking thereof. The area of the opening means in protective cover 20 may be made larger or smaller simply by positioning central surface means of cover 20 either farther from or closer to pie 22 respectively.

With the cover 20 expanded, the pie 22 is placed in a heating oven 25, the outline of which is shown in FIG. 2, which has an upper heating element designated by the numeral 26 and a lower heating element designated by the numeral 27. The temperature within oven 25 is controlled by suitable temperature sensors within oven 25 which control the heating action of the heating elements 26 and/or 27 in a known manner to allow proper baking of the pie 22 within its pan 21 and with the protective cover 20 assuring that the pie crust does not char during the baking process.

Figure 5:
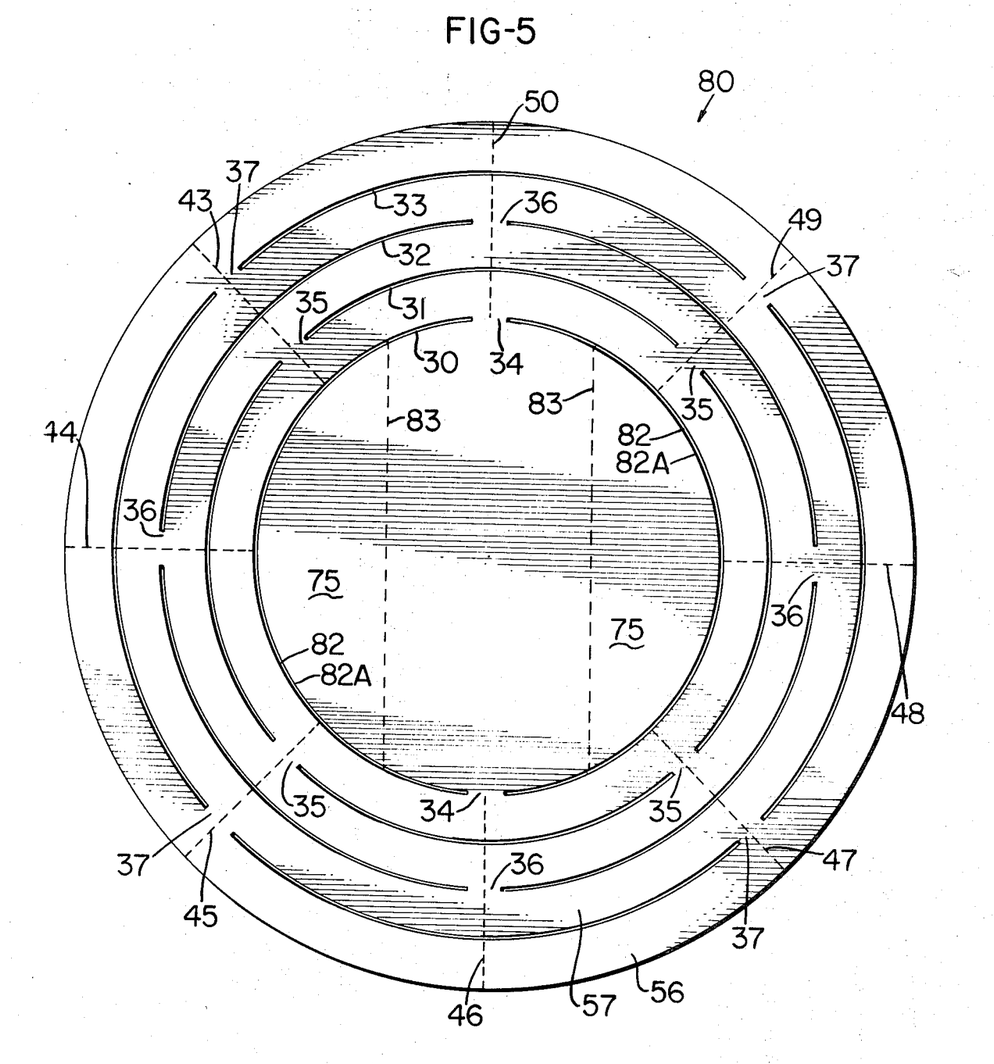
FIG. 5 is a plan view of the blank used to make the protective cover means of FIG. 1.

As seen particularly in FIGS. 1 and 5 of the drawings, the expandable opening means provided in protective cover 20 is defined by a plurality of spaced apart ring-like cut means arranged inwardly of its peripheral edge. In this example of the invention the protective cover 20 has a circular peripheral outline (corresponding generally to the outline of pie pan 21) and the ring-like cut means comprise a plurality of substantially circular cut means or cuts designated by the numerals 30, 31, 32, and 33 arranged in a concentric manner about a central axis in the protective cover 20 and defining substantially annular strip means between each pair of circular cuts.

Each substantially ring-like cut means 30, 31, 32, and 33 has a plurality of spaced apart interruption means or interruptions provided therein. The interruptions in each ring-like cut means define fastening means for fastening that portion of the protective cover 20 which is arranged inwardly of the particular ring-like cut means to the remainder of the protective cover 20.

Thus, substantially continuous circular cut means 30 has a plurality of interruption means each designated by the numeral 34, circular cut means 31 has a plurality of interruption means each designated by the numeral 35, circular cut means 32 has a plurality of interruption means each designated by the numeral 36, and circular cut means 33 has a plurality of interruption means each designated by the numeral 37. The interruption means 34–37 define spaced apart fastening means as previously indicated and may be referred to interchangeably throughout this disclosure as either interruption means or fastening means. Each particular set or group of fastening means 34, 35, 36, or 37 in each instance fastens or holds that portion of the protective cover 20 which is arranged inwardly of its respective cut means 30, 31, 32, or 33 to the remainder of the protective cover 20.

The circular cut means 30–33 and each group of associated fastening means 34–37 cooperate to enable a central portion or central surface means of the protective cover 20 to be pulled outwardly as shown in FIG. 2 to define the previously mentioned expandable opening means in the cover 20. In addition, the protective cover 20 is preferably made of sheet means of comparatively stiff material and the arrangement of the circular cut means and associated fastening means is such that upon pulling the central surface means in protective cover 20 outwardly a resilient structure designated generally by the numeral 42 is defined for a purpose to be described later in this disclosure.

As seen particularly in FIGS. 1 and 5 of the drawings, the plurality of fastening means associated with each circular cut means are arranged at different peripheral positions relative to the fastening means in immediately adjacent circular cut means. This arrangement assures the provision of the yieldable structure 42 which has maximum resiliency as well as assuring that the opening means defined in the protective cover 20 can be opened to practically any desired size opening.

The fastening means provided in protective cover 20 are arranged in a plurality of radially arranged sets which in this example of the invention are arranged to coincide with radial lines preferably defined by score lines 43, 44, 45, 46, 47, 48, 49, and 50. The disclosure will now continue referring to the fastening means arranged to coincide with a particular radial score line as the set having the same number as such particular radial score line. For example, set 43 refers to the set of fastening means along score line 43, etc.

The fastening means in each set are provided as interruption means in alternate ones of the outer ones of the plurality of circular cut means 30–33. For example, in set 43 a fastening means or interruption 37 is provided at circular cut means 33, no fastening means or interruption is provided in circular cut means 32, and extending farther radially inwardly it will be seen that a fastening means or interruption 35 is provided at circular cut means 31.

At immediately adjacent set 44 no interruption or fastening means is provided in circular cut means 33, a fastenig means or interruption 36 is provided at circular cut means 32, and again no interruption or fastening means is provided in circular cut means 31. At radially arranged set 45 it will be seen that the fastening means are provided to extend radially inwardly in an alternate manner as described for set 43, i.e. fastened at circular cut means 33 and 31.

Thus, it will be seen that an interruption or fastening means 37 is provided in circular cut means 33 at the intersection of cut means 33 with alternate ones of radial score lines 43–50. In a similar manner it is seen that an interruption or fastening means 36 is provided in circular cut means 32 at the intersection of circular cut means 36 with alternate ones of the radial lines 43–50

The above described construction assures that each annular strip means defined between immediately adjacent pairs of circular cut means is supported to the remainder of the protective cover 20 at different peripheral (circumferential in this case) positions on its inside edge relative to its outside edge. This enables the central surface means of cover 20 to be pulled outwardly and define the expandable opening means previously mentioned.

The protective cover 20 is fastened in position over peripheral upper flange means or the peripheral upper flange 55 of pie pan 21 in a unique manner. The circular cut means 33 in the cover 20 defines a first annular strip means or annular strip designated by the numeral 56 which extends outwardly of the circular cut means 33. A second annular strip means or annular strip 57 is provided between circular cut means 32 and 33.

The protective cover 20 is fastened to flange 55 of pie pan 21 by fastening top surface means indicated generally by the numeral 60 of annular strip 56 beneath the lower surface means of peripheral flange 55. It will be appreciated that the outside diameter of the flange 55 is slightly larger than the diameter of circular cut means 33 whereby the annular strip 56 is snapped in position under the flange 55 to hold the protective cover 20 in position.

As seen particularly in FIG. 1 of the drawings, the annular strip 57 is arranged so that it extends over the peripheral upper edge of the pie crust 23. In addition to protecting crust portion 23 while pie 22 is in its shipping and display carton the annular strip 57 protects and shields the crust from heat emitting from heating element 26 to prevent crust 23 from charring during the process of baking of pie 22.

As previously stated, the protective cover 20 is adapted to be expanded outwardly from the configuration shown in FIG. 1 to the configuration of FIG. 2 to define the resilient structure 42. In the configuration of FIG. 2 it will be seen that a maximum area opening is provided for venting pie 22 during baking thereof; however, upon pulling central surface means of the cover 20 outwardly a partial amount the pie pan 21 and with protective cover 20 attached thereto is easily placed in position within an enclosing carton 62. Carton 62 is used to protect the entire pie and its pan during transportation, handling, and display thereof.

Figure 3:
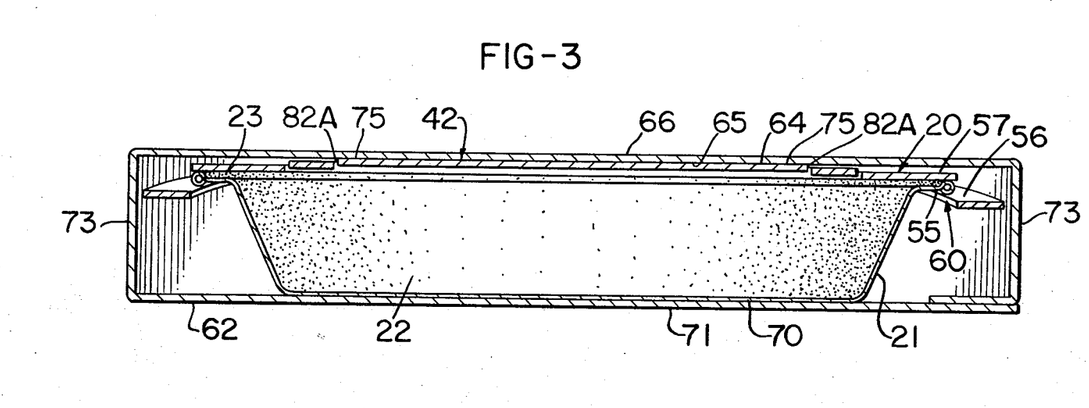
FIG. 3 is a view of the pie of FIG. 1 in elevation and in an upright position within its associated packing carton and showing the pie pan, protective cover means, and carton in cross section.
Figure 4:
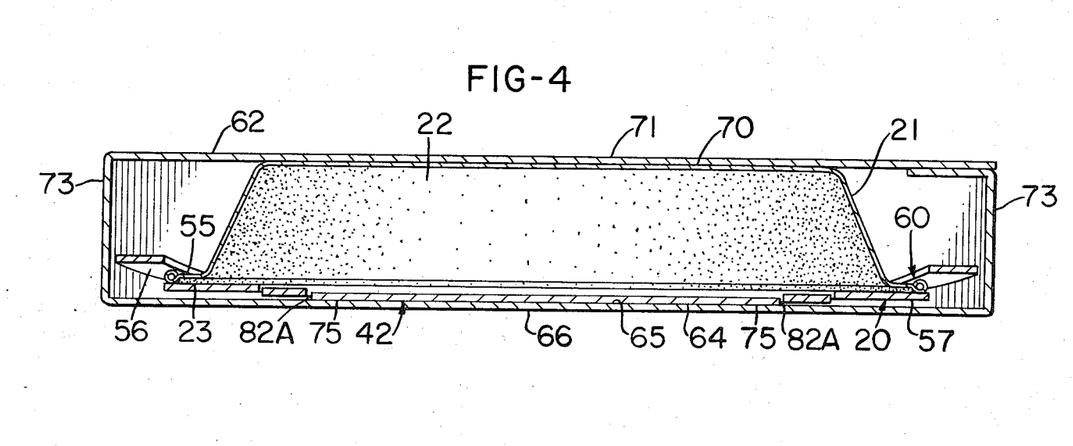
FIG. 4 is a sectional view similar to FIG. 3 particularly illustrating the protective cover means holding the pie and pie pan in position against movement relative to its enclosing carton after such carton has been inverted.

As illustrated in FIGS. 3 and 4 of the drawings, the central portion or surface means of the cover 20 is expanded so that the resulting resilient structure 42 has its top surface means shown at 64 engaging inside surface means 65 of a wall 66, shown in FIG. 3 as the top wall, of enclosing carton 62 while the bottom 70 of pie pan 21 is supported upon the inside surface of an oppositely arranged bottom wall 71 of the enclosing carton 62. The resilient structure 42 acts between top wall 66 and bottom wall 71 of carton 62 to hold the pie pan 21 and pie 22 firmly within carton 62 while preventing relative movement therebetween to assure that the pie 2 is not tossed around and broken within carton 62 during the process of handling thereof. FIG. 4 highlights the fact that the pie 22 cannot move around within the carton 62 by showing the pie and carton in an inverted position and showing that the pie 22 and pie pan 21 are held yieldingly urged against wall 71 of carton 62 with carton 62 inverted.

The carton 62 also has its vertical wall means designated by the numeral 73 arranged to provide minimum clearance between the peripheral edge of protective cover 20 and the vertical walls 73.

Protective cover 20 has grasping means shown as a pair of grasping tabs each designated by the same numeral 75 provided in its central surface means or portion to enable pulling the central surface means of protective cover 20 outwardly to the expanded configuration shown in FIG. 2. The grasping means may be formed as an integral part of protective cover 20 as will be described in detail in connection with the blank used to form protective cover 20 or may comprise any suitable means fastened as by adhesive means to the central portion of the protective cover 20.

Thus, it is seen that the cooperating circular cut means and fastening means provided in protective cover 20 together with the radial score lines provided therein enable the provision of a protective cover which may be used to protect a frozen pie, for example, within its enclosing carton 62 by preventing it from moving around within such carton. Upon removing the pie from the carton 62, the protective cover 20 can be expanded to enable baking of the pie in an associated baking oven.

In addition, it will be appreciated that the construction of the protective cover 20 is such that an expandable opening means can be provided therein of practically any desired area merely by pulling the protective cover 20 outwardly away from pie pan 21 any desired amount. Also, with the protective cover 20 expanded the construction of such cover is such that it prevents direct impingement of heat radiating from the upper heating element 26 of oven 25 against the pie 22 being baked within such oven to assure that the pie does not burn along the top while the center portion thereof remains essentially unbaked.

Protective cover 20 can be formed in any suitable manner and made from any suitable material. It is preferably formed from the blank 80, illustrated in FIG. 5. The blank 80 is preferably made of a plurality of layers including metallic and nonmetallic layer means with the nonmetallic layer means being preferably made of material means which resists charring when subjected to a heat environment, such as a baking oven. The blank 80 also preferably has a side such as an exposed surface thereof laminated with metallic foil, such as aluminum-containing metallic foil, or the like, suitably colored, embossed, imprinted, or remaining plain, as desired.

Blank 80 is suitably cut and scored to enable forming the resulting protective cover 20. The major cut and score means provided in blank 80 have been described in connection with the previous description of the protective cover 20; therefore, such cut and score means will not be described again but will merely be designated by the same numerals in FIG. 5 as previously.

The only portion of blank 80 which has not been previously described in detail is the grasping means which in this exemplary embodiment of the invention is provided as an integral part of blank 80 and comprises a pair of grasping tabs 75. Each tab 75 is defined by a tab-forming arcuate cut means or cut 82 which is substantially semicircular in configuration.

Score means shown as a score line 83 extends between the terminal ends of each tab-forming substantially semicircular cut 82 and each score line 83 defines hinge means about which the tab means or grasping tab 75 is hinged to enable pulling the central portion of the blank 80 outwardly to define protective cover 20. Upon folding each tab means 75 outwardly about its associated hinge line 83 it will be seen that aperture means shown as a pair of apertures or openings each designated by the numeral 84 (see FIG. 2) is provided in the central surface means of the resulting protective cover 20.

Upon partially expanding the resulting protective cover 20 made from blank 80, it will be seen that each arcuate cut 82 defines a top arcuate edge 82A of the particular grasping tab 75. The arcuate edges 82A serve as cam surfaces camming against the inside surface 65 of top wall 66 of the packing carton 62 enabling easy insertion of the pie 22 with its protective cover 20 partially expanded in position into the packing carton 62. Once the pie 22 is placed within carton 62 the resilient nature of the expanded protective cover holds such pie firmly in position in the manner previously described.

Another exemplary embodiment of the protective cover means of this invention is illustrated in FIGS. 6–9 of the drawings and is designated generally by the numeral 85. Protective cover means or cover 85 is fastened in position over a dish-like container or pan 86 which has peripheral flange means designated by the numeral 87. The protective cover 85 in this example of the invention is fastened in position to pan 86 by folding the terminal edge portion of flange 87 around the terminal peripheral edge of protective cover 85 to define a substantially U-shaped configuration as illustrated at 90 in FIG. 9 of the drawings.

The protective cover 85 is held in position against pan 86 so that it remains in a substantially flat plane while it is protecting a product, such as a food product, carried within pan 86 with pan 86 in an associated packing carton similar to carton 62 used for pie pan 21. However, the pan 86 is preferably used to contain a food product which requires heating or baking within an oven in a similar manner as described in connection with the embodiment of this invention illustrated in FIG. 2. Prior to placing the pan 86 with its protective cover 85 fastened in position within an associated oven, cover 85 is expanded essentialy to the configuration illustrated in FIG. 7 of the drawings thereby defining a resilinet structure designated generally by the numeral 92 and being similar in function to resilient structure 42 previously described.

Figure 6:
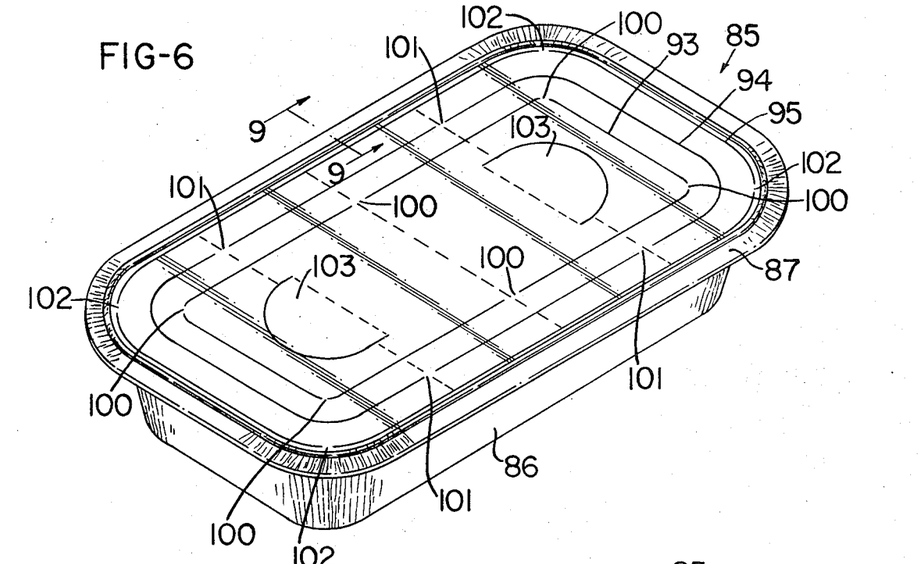
FIG. 6 is a perspective view illustrating another embodiment of protective cover means of this invention used in connection with a dish-like container having a rectangular outline and peripheral flange means folded in position to hold the protective cover means firmly against the dish-like container.

The protective cover 85 of this exemplary embodiment of the invention has a polygonal peripheral outline which is shown as a substantially rectangular outline. However, it will be appreciated that the outline of protective cover 85 may have any desired peripheral shape.

Figure 8:
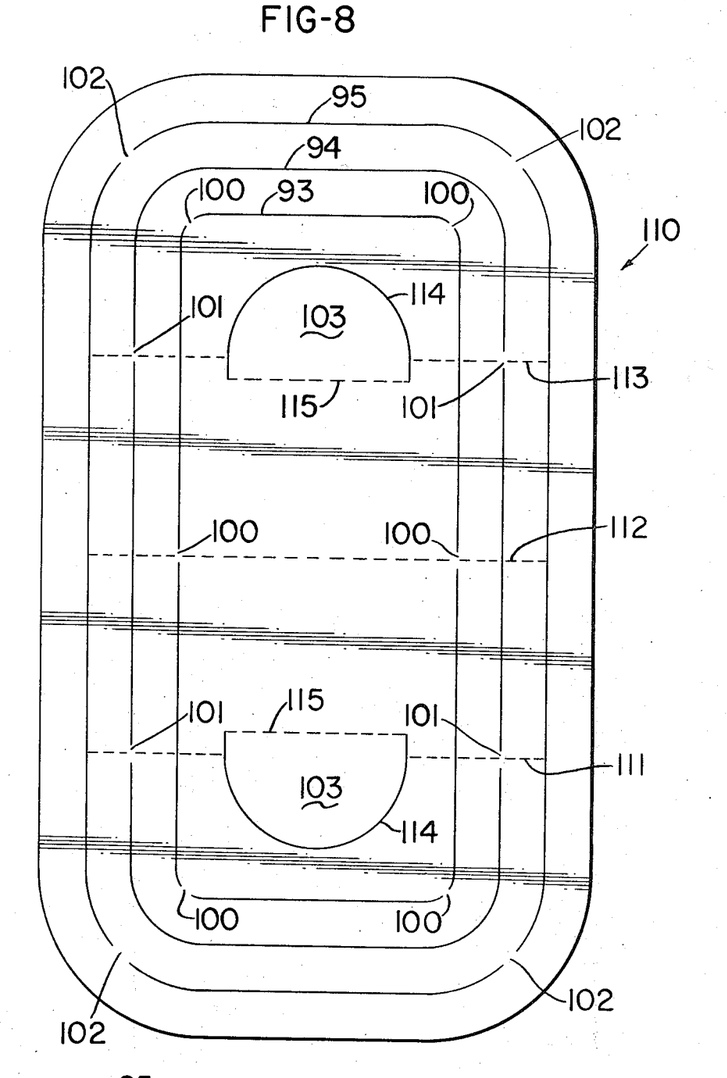
FIG. 8 is a plan view of the blank used to make the protective cover means of FIG. 6.
Figure 9:
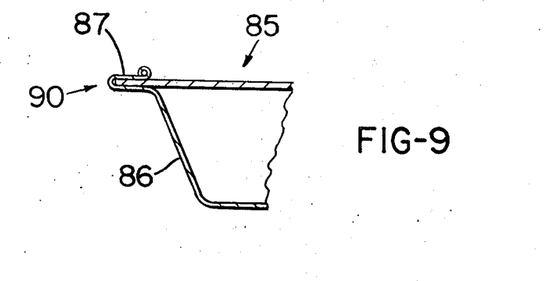
FIG. 9 is a fragmentary sectional view illustrating the manner of fastening the protective cover means of FIG. 6 in position against its associated dish-like container.

In a similar manner as in protective cover 20 the protective cover 85 has a plurality of spaced apart substantially continuous ring-like cut means arranged inwardly of its peripheral rectangular edge and designated by the numerals 93, 94, and 95 respectively, see FIGS. 6 and 8. Each ring-like cut means has a plurality of spaced apart interruption means which will define fastening means for fastening that portion of the protective cover 85 which is arranged inwardly of the particular ring-like cut means to the remaining outer portion of the blank. As described previously in connection with protective cover 20 the phrases interruption means and fastening means will be used interchangeably in this latter embodiment.

The ring-like cut means 93 arranged at the innermost position on protective cover 85 has a plurality of spaced apart interruption means or fastening means each designated by the numeral 100, ring-like cut means 94 has a plurality of spaced apart interruption means or fastening means each designated by the numeral 101, and ring-like cut means 95 has a plurality of spaced apart interruption means or fastening means each designated by the numeral 102. The particular fastennig means associated with each ring-like cut means 93–95 are arranged at different peripheral positions relative to fastening means in immediately adjacent ring-like cut means in a similar manner as described in connection with protective cover 20.

Figure 7:
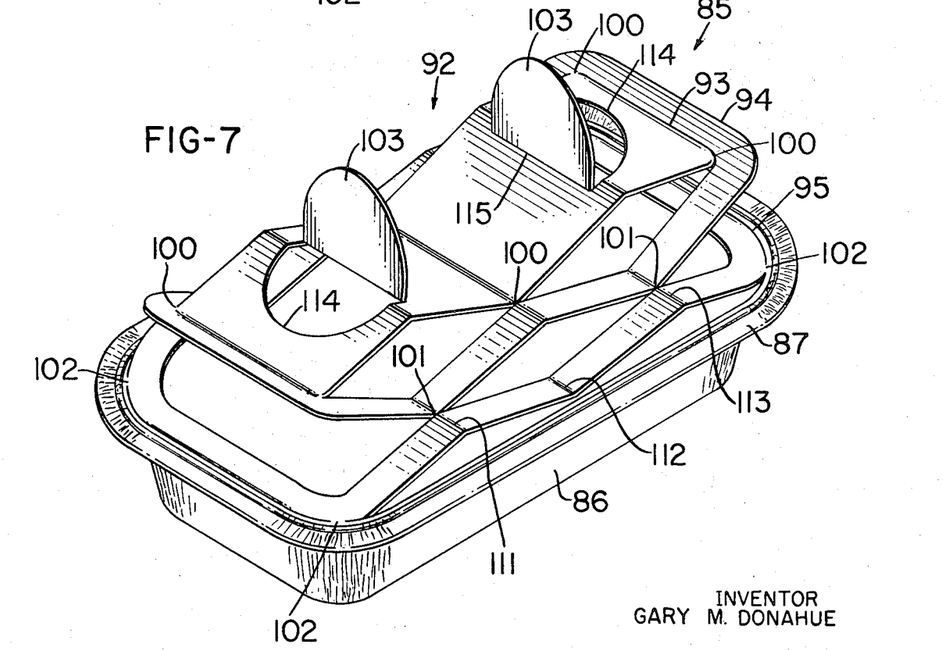
FIG. 7 is a perspective view illustrating the container of FIG. 6 with its protective cover means expanded outwardly to define large area opening means.

With the above described staggered arrangement of the fastening means at different peripheral positions in their respective ring-like cut means, the protective cover 85 can be expanded in an accordion-like manner essentially to the configuration illustrated in FIG. 7 of the drawings simply by grasping suitable grasping means shown as a pair of grasping tabs 103 provided in the central surface means of the protective cover 85 and pulling outwardly to define the resilient construction 92 illustrated in FIG. 7.

As seen in FIGS. 6 and 7 of the drawings, each ring-like cut means provided in protective cover 85 preferably has a substantially rectangular outline which corresponds generally to the rectangular peripheral outline of the protective cover 85. Suitable score means are also provided in the protective cover 85 to enable easier outward expansion of cover 85 and such score means will be described in connection with the blank (illustrated in FIG. 8) which is used to make the resulting protective cover 85.

The protective cover 85 can be formed in any suitable manner and made from any suitable material. It is preferably formed from the blank 110 illustrated in FIG. 8 of the drawings. The blank 110 is made of a material which will not char and has a side such as the exposed surface thereof laminated with metallic foil, such as aluminum-containing metallic foil, or the like.

Blank 110 has ring-like cut means 93–95 and associated fastening means 100–102 respectively provided therein in a manner as previously described. In addition, blank 110 has a plurality of three spaced apart score means extending across its central portion and designated by the numerals 111, 112, and 113. The score means 111 and 113 are each provided in two sections arranged on opposite sides of an associated grasping tab 103.

Each grasping tab 103 is defined by an arcuate (substantially semicircular) cut means or cut 114; and, the two cuts 114 are preferably arranged with their open ends facing toward each other. A score line designated by the numeral 115 extends between the terminal open ends of each semicircular cut 114 and defines a hinge line about which the associated grasping tab 103 can be hinged outwardly.

The score means 111–113 are preferably arranged in parallel spaced apart relation and the terminal end of each score means 111–113 preferably abuts, without extending outwardly of, cut means 95. The score means 111 and 113 extend on opposite sides of an associated arcuate cut 114 and are each comprised of two portions. The arrangement of the score lines 111–113 and the fastening means 100–102 enable the resulting cover 85 made from blank 110 to be expanded to the configuration of FIG. 7 to provide a maximum area opening to enable proper baking or heating of a product contained within pan 86 without the likelihood of burning or charring of the top surface of the product contained within the container means 86.

The protective cover 85 of this embodiment of the invention defines a protective adjustable vent area tent which may be very effective in providing controlled cooking of food products such as a turkey, for example, when using a tent method of cooking.

The protective cover 20 and/or 85 is readily expanded to a configuration which provides a controlled maximum area opening above its associated dish-like container. In each instance heat radiating from an upper heating element and directed toward the product contained within the particular dish-like container is prevented from impinging directly against the top of the particular product carried within such dish-like container and thereby prevents charring thereof. However, the size opening provided in each protective cover is sufficient to assure that heated air will contact the top surface of the particular product carried within the dish-like container and assure proper baking.

Thus, it is seen that not only protective cover means but also an improved method is provided by this invention in which a product may be heated or baked within a heating oven while providing maximum protection for such product and yet assuring that the food product is baked or cooked in a desired manner.

Each protective cover 20 and 85 described above has ring-like cut means provided therein each having a configuration corresponding to the outer peripheral configuration of the particular protective cover. However, it will be appreciated that the ring-like cut means need not necessarily correspond in configuration to the outline of their associated cover. Further, ring-like cut means in a given protective cover may have different configurations, as desired.

In many applications of this invention the blanks used to make the protective covers 20 and 85 preferably have metallic foil laminated on both sides of an inexpensive noncharring type of material. Also, the thickness and character of the noncharring material should be such as to provide the desired resilient structure upon expanding the particular protective cover outwardly.

Each protective cover 20 and 85 is thus made using materials which are comparatively inexpensive. This provides covers which may be disposed after each use.

Terms such as "top," "bottom," "sides," "inwardly," "outwardly," and the like, have been used throughout this disclosure for ease of description to correspond to the arrangement of component parts as presented in the drawings and such terms should not be considered as limiting the scope of this invention in any way.

Thus, it is seen that improved dual purpose protective cover means has been provided by this invention.

Further, this invention provides improved blanks for making such protective cover means.

Also, this invention provides an improved method of baking using unique adjustable vent area protective cover means.

While present preferred embodiments of this invention, and methods of practicing the same, have been illustrated and described, it will be recognized that this invention may be otherwise variously embodied and practiced within the scope of the following claims.

What is claimed is:

1. In combination: a dish-like container, a product within said container, and a dual purpose protective cover made of a comparatively stiff heat resistant material fastened over said dish-like container for protecting said product while it is in an associated carton and during heating of said product in a heated environment after removal thereof from said carton, said cover having a peripheral portion which reinforces the peripheral portion of said container and helps prevent damage thereto and to said product, said cover also having expandable opening means allowing heated air to contact said product.

2. The combination as set forth in claim 1 in which said comparatively stiff heat resistant material comprises a bendable nonmetallic material which resists charring, said expandable opening means in said cover is defined by a plurality of spaced apart ringlike cut means arranged inwardly of its peripheral edge and a plurality of spaced apart interruption means in each of said ringlike cut means defining fastening means for fasteing that portion of said cover arranged inwardly of the associated ringlike cut means to the remainder of said cover, said ringlike cut means and fastening means cooperating to enable a central portion of said cover to be pulled outwardly to define said expandable opening means, and said cut means and fastening means in said comparatively stiff material also cooperating so that said central portion defines a resilient structure which acts between said dish-like container and adjacent inside surface means of said carton to hold said dish-like container firmly within said carton.

3. The combination as set forth in claim 2 in which said fastening means associated with each ringlike cut means are arranged at different peripheral positions relative to fastening means in immediately adjacent ringlike cut means to assure provision of said resilient structure having maximum resiliency.

4. The combination as set forth in claim 1 in which said cover is made of multiple layer sheet means in which at least one outside layer of said sheet means is made of metallic foil and nonmetallic layer means of said sheet means is made of material means which resists charring.

5. The combination as set forth in claim 2 and further comprising at least one tab provided as a part of said central portion to enable pulling said central portion outwardly to define said opening means.

6. The combination as set forth in claim 5 in which said container has a polygonal peripheral outline and said cover has a corresponding polygonal peripheral outline and each of said plurality of ringlike cut means has a configuration similar to an adjacent ringlike cut means.

7. The combination as set forth in claim 5 in which said container has a circular peripheral outline and said cover has a corresponding circular peripheral outline and said plurality of spaced apart ringlike cut means comprises a plurality of substantially circular cut means arranged in a concentric manner about a central axis.

8. The combination as set forth in claim 7 in which, said fastening means are provided in said cover means in a plurality of sets with each set being arranged substantially on a radial line, said fastening means in each set being provided in alternate outer ones of said plurality of circular cut means, and the fastening means associated with each circular cut means being provided so as to intersect alternate ones of said radial lines, said circular cut means and fastening means defining said resilient structure.

9. In combination: a pie pan having a peripheral upper flange, a pie contained in said pan and having a peripheral crust supported on said flange, and a dual purpose protective cover of circular peripheral outline fastened over said pie pan for protecting said pie while it is contained in an associated carton and during heating of said pie in a heated environment after removal thereof from said carton, said cover comprising expandable opening means allowing heated air to contact said pie, said expandable opening means being defined by a plurality of spaced apart ringlike cut means arranged inwardly of its peripheral edge and a plurality of spaced apart interruption means in each of said ringlike cut means defining fastening means for fastening that portion of said cover arranged inwardly of the associated ringlike cut means to the remainder of said cover, said ringlike cut means and fastening mean cooperating to enable a central portion of said cover to be pulled outwardly to define said expandable opening means and said central portion defining a resilient structure which acts between said dish-like container and adjacent inside surface means of said carton to hold said dish-like container firmly within said carton, said plurality of spaced apart ringlike cut means comprising a plurality of substantially circular cut means arranged in a concentric manner about a central axis, said fastening means being provided in said cover means in a plurality of sets with each set being arranged substantially on a radial line, said fastening means in each set being provided in alternate outer ones of said plurality of circular cut means, said fastening means associated with each circular cut means being provided so as to intersect alternate ones of said radial lines, said circular cut means and fastening means defining said resilient structure, said plurality of substantially circular cut means in said cover comprising an outer substantially circular cut means defining a first annular strip outwardly of said outer cut means and an adjacent substantially circular cut means provided immediately adjacent said outer cut means defining a second annular strip between said outer cut means and adjacent cut means, said cover being adapted to be fastened in position against said pie pan by fastening top surface means of said first annular strip beneath said peripheral upper flange of said pie pan with said second annular strip covering said peripheral crust of said pie to prevent charring thereof during exposure to said heated environment.

10. The combination as set forth in claim 9 in which said cover further comprises arcuate cut means in said central portion defining tab means within the outline of said arcuate cut means having arcuate edge means and score means extending between the open ends of said arcuate cut means and defining hinge means for said tab means, said tab means defining grasping means to enable pulling said central portion of said protective cover outwardly to define said opening means and said arcuate edge means defining cam means enabling said pie pan and its expanded cover to be easily inserted within said carton.

11. A blank being cut and scored to define a resulting protective cover, said resulting cover being adapted to be fastened over a dish-like container containing a food product for the dual purpose of protecting said food product while it is in an associated carton and during heating of said food product in a heated environment, said blank being made of a comparatively stiff bendable heat resistant sheet material which includes a nonmetallic char-resistant material and comprising, a plurality of spaced apart substantially continuous ringlike cut means arranged inwardly of the peripheral edge of said blank, and a plurality of spaced apart interruption means in each of said ringlike cut means defining fastening means for fastening that portion of said blank arranged inwardly of the associated ringlike cut means to the remainder of said blank, said ringlike cut means and fastening means in said comparatively stiff material cooperating to enable a central portion of said blank and hence said resulting cover made from said blank to be pulled outwardly to define a resilient structure as well as expandable opening means.

12. A blank as set forth in claim 11 in which said fastening means associated with each ringlike cut means are arranged at different peripheral positions relative to fastening means in immediately adjacent ringlike cut means to assure said resulting cover is provided with said resilient structure having maximum resiliency.

13. A blank as set forth in claim 12 having tab forming cut means provided therein and score means extending between the terminal ends of said tab forming cut means to define a tab hinged about said score means, said tab being useable to pull said central portion outwardly and to provide an aperture in said central portion of said resulting cover upon being hinged outwardly about said score means.

14. A blank as set forth in claim 12 in which said sheet material is in the form of a multiple layer sheet having at least one outside layer made of metallic foil.

15. A blank as set forth in claim 12 having a substantially polygonal peripheral outline and each of said plurality of ringlike cut means has a corresponding substantially polygonal configuration.

16. A blank as set forth in claim 12 having a substantially circular peripheral outline and said plurality of spaced apart ringlike cut means comprises a plurality of substantially circular cut means arranged in a concentric manner about a central axis.

17. A blank as set forth in claim 16 in which said fastening means are provided therein a plurality of sets with each set being arranged substantially on a radial line, said fastening means in each set being provided in alternate outer ones of said plurality of circular cut means, and the fastening means associated with each circular cut means being provided so as to intersect alternate ones of said radial lines, said circular cut means and fastening means defining said resilient structure in said resulting cover.

18. A blank as set forth in claim 17 further comprising a plurality of score means provided therein, each of said score means coinciding with an associated radial line and extending from the inner circular cut means to the peripheral edge of said blank.

19. A blank as set forth in claim 17 in which said plurality of substantially circular cut means comprises an outer substantially circular cut means defining a first annular strip outwardly of said outer cut means and an adjacent substantially circular cut means provided immediately adjacent said outer cut means defining a second annular strip between said outer cut means and adjacent cut means, said first annular strip has a circular peripheral edge, and said blank is adapted to be fastened in position against said dish-like container by fastening top surface means of said first annular strip beneath a peripheral flange comprising said dish-like container with said second annular strip covering a portion of said food product supported by said peripheral flange to prevent charring thereof during exposure to said heated environment.

References Cited

UNITED STATES PATENTS

| | | | |
|---|---|---|---|
| 2,819,976 | 1/1958 | Hines | 99—171 |
| 3,040,968 | 6/1962 | Long | 206—45.33 X |
| 3,067,039 | 12/1962 | Crane | 99—171 |
| 3,109,579 | 11/1963 | Crane. | |
| 3,214,074 | 10/1965 | Schechter. | |
| 3,298,505 | 1/1967 | Stephenson | 229—43 |
| 3,425,845 | 2/1969 | Dunn | 99—171 |

FRANK W. LUTTER, Primary Examiner

W. L. MENTLIK, Assistant Examiner

U.S. Cl. X.R.

206—46; 229—14; 43